(12) United States Patent
Manor

(10) Patent No.: US 9,453,654 B2
(45) Date of Patent: Sep. 27, 2016

(54) METHOD OF DISPERSING AIR, JETS FROM AIR CONDITIONING SYSTEMS AND MIXING THEM WITH THE AMBIENT AIR OF AN ENCLOSURE FOR BETTER COMFORT AND APPARATUS TO CREATE THE JETS

(75) Inventor: Gedalyahu Manor, Haifa (IL)

(73) Assignee: AIRGREEN LTD., Haifa (IL)

( * ) Notice: Subject to any disclaimer, the term of this patent is extended or adjusted under 35 U.S.C. 154(b) by 545 days.

(21) Appl. No.: 12/452,127

(22) PCT Filed: Apr. 21, 2008

(86) PCT No.: PCT/US2008/005079
§ 371 (c)(1),
(2), (4) Date: Dec. 16, 2009

(87) PCT Pub. No.: WO2009/038601
PCT Pub. Date: Mar. 26, 2009

(65) Prior Publication Data
US 2010/0132383 A1   Jun. 3, 2010

Related U.S. Application Data

(60) Provisional application No. 60/994,766, filed on Sep. 21, 2007.

(51) Int. Cl.
*F24F 13/06* (2006.01)
*F24F 11/00* (2006.01)
(Continued)

(52) U.S. Cl.
CPC .......... *F24F 11/0078* (2013.01); *B60H 1/345* (2013.01); *F24F 1/0007* (2013.01); *F24F 13/06* (2013.01); *F24F 13/075* (2013.01); *F24F 2001/004* (2013.01)

(58) Field of Classification Search
CPC ... B60H 1/345; B60H 1/3407; F24F 13/075; F24F 1/0007; F24F 13/06; F24F 2001/004
USPC ............ 62/91; 454/261, 284, 301, 308, 263, 454/265–268
See application file for complete search history.

(56) References Cited

U.S. PATENT DOCUMENTS 2,077,734 A * 4/1937 Anderson ...................... 454/323
2,086,022 A * 7/1937 Feinberg ....................... 454/258
(Continued)

FOREIGN PATENT DOCUMENTS

CN   2035064 U   3/1989
CN   1594993 A   3/2005
(Continued)

OTHER PUBLICATIONS

International Search Report PCT/ISA/210 in International Application PCT/US2008/005079.
(Continued)

*Primary Examiner* — Steven B McAllister
*Assistant Examiner* — Frances F Hamilton
(74) *Attorney, Agent, or Firm* — Browdy and Neimark, PLLC

(57) ABSTRACT

The invention relates to a method and equipment for dispersing the air flowing out of air conditioning systems and mixing it with the ambient air of the enclosure to be conditioned. The quick mixing of the conditioned air jets will create better comfortable feeling of people in front of the conditioned air outlet.

37 Claims, 17 Drawing Sheets

(51) Int. Cl.
  *F24F 1/00*    (2011.01)
  *F24F 13/075*  (2006.01)
  *B60H 1/34*    (2006.01)

(56) References Cited

U.S. PATENT DOCUMENTS

| | | | |
|---|---|---|---|
| 2,381,345 A * | 8/1945 | Greenlaw | 454/308 |
| 2,825,274 A * | 3/1958 | Kurth et al. | 454/261 |
| 3,065,685 A * | 11/1962 | Sylvester et al. | 454/316 |
| 3,101,690 A * | 8/1963 | O'Day et al. | 72/325 |
| 3,227,063 A * | 1/1966 | Lambert | 454/299 |
| 3,482,506 A * | 12/1969 | Bruns | 454/309 |
| 3,703,141 A * | 11/1972 | Pernoud | 454/155 |
| 3,736,858 A * | 6/1973 | Mercier | 454/286 |
| 3,877,356 A * | 4/1975 | Bruns | 454/299 |
| 3,877,678 A * | 4/1975 | Jung | 251/305 |
| 4,022,599 A * | 5/1977 | Wilson et al. | 62/244 |
| 4,500,479 A * | 2/1985 | Fukami et al. | 261/98 |
| 4,516,483 A * | 5/1985 | Bosman | 454/301 |
| 4,660,390 A | 4/1987 | Worthington | |
| 4,679,495 A * | 7/1987 | Locker | 454/299 |
| 4,686,890 A * | 8/1987 | Stouffer et al. | 454/155 |
| 4,699,322 A * | 10/1987 | Jobst | 239/503 |
| 4,864,919 A * | 9/1989 | Schulz et al. | 454/127 |
| 4,915,021 A * | 4/1990 | Soethout | 454/155 |
| 4,979,429 A * | 12/1990 | Soethout | B60H 1/3442 454/162 |
| 5,052,285 A * | 10/1991 | Rich | 454/301 |
| 5,078,046 A * | 1/1992 | Mascolo et al. | 454/157 |
| 5,129,859 A * | 7/1992 | Yagi | 454/155 |
| 5,137,491 A * | 8/1992 | Ishihara et al. | 454/152 |
| 5,230,656 A * | 7/1993 | Paterson et al. | 454/263 |
| 5,364,305 A * | 11/1994 | Zieve | 454/261 |
| 5,470,276 A * | 11/1995 | Burnell et al. | 454/155 |
| 5,586,935 A * | 12/1996 | Kotoh et al. | 454/320 |
| 5,591,079 A * | 1/1997 | Saida | 454/155 |
| 5,660,588 A * | 8/1997 | Kotoh et al. | 454/285 |
| 5,740,962 A * | 4/1998 | Manor et al. | 239/77 |
| 6,012,297 A * | 1/2000 | Ichishi et al. | 62/179 |
| 6,019,288 A * | 2/2000 | Arold et al. | 236/13 |
| 6,276,440 B1 | 8/2001 | Kaga et al. | |
| 6,340,328 B1 * | 1/2002 | Schwandt et al. | 454/155 |
| 6,652,371 B2 * | 11/2003 | Kamio | 454/155 |
| 6,739,968 B1 * | 5/2004 | Gehring et al. | 454/152 |
| 6,800,023 B2 * | 10/2004 | Demerath | 454/155 |
| 6,878,056 B2 * | 4/2005 | Robinson | 454/261 |
| 6,941,967 B2 * | 9/2005 | Butera et al. | 137/351 |
| 6,942,563 B2 * | 9/2005 | Pesch et al. | 454/152 |
| 7,044,849 B2 * | 5/2006 | Dippel | 454/143 |
| 7,097,555 B2 * | 8/2006 | Bourbon | 454/157 |
| 7,188,485 B2 * | 3/2007 | Szpekman | 62/304 |
| 7,354,340 B2 * | 4/2008 | Mochizuki et al. | 454/152 |
| 7,604,533 B2 * | 10/2009 | Ogura et al. | 454/155 |
| 7,959,717 B2 * | 6/2011 | Yano et al. | 96/27 |
| 8,550,886 B2 * | 10/2013 | Kogler et al. | 454/75 |
| 2006/0172679 A1 * | 8/2006 | Gehring et al. | 454/152 |
| 2006/0207758 A1 * | 9/2006 | Elliot et al. | 165/202 |
| 2008/0081550 A1 * | 4/2008 | Shibata et al. | 454/155 |
| 2008/0153409 A1 * | 6/2008 | Koop | 454/261 |
| 2009/0275277 A1 * | 11/2009 | Al-Alusi et al. | 454/76 |

FOREIGN PATENT DOCUMENTS

| | | | | |
|---|---|---|---|---|
| EP | 0614056 A1 | | 9/1994 | |
| EP | 0722657 A1 | | 7/1996 | |
| GB | 2221530 A | * | 2/1990 | F24F 13/06 |
| JP | 60-155844 A | | 10/1985 | |
| JP | 05096941 A | * | 4/1993 | B60H 3/02 |
| JP | 10-019354 A | | 1/1998 | |
| JP | 11-278046 A | | 10/1999 | |
| JP | 2006-112685 A | | 4/2006 | |
| WO | 2007/045507 A1 | | 4/2007 | |

OTHER PUBLICATIONS

Written Opinion of the International Searching Authority PCT/ISA/237 in International Application PCT/US2008/005079.
ASHARE standard, Engineering Guidelines, B11-813, Titus 2008-2009 Product Catalog, www.titus-hvac.com.

* cited by examiner

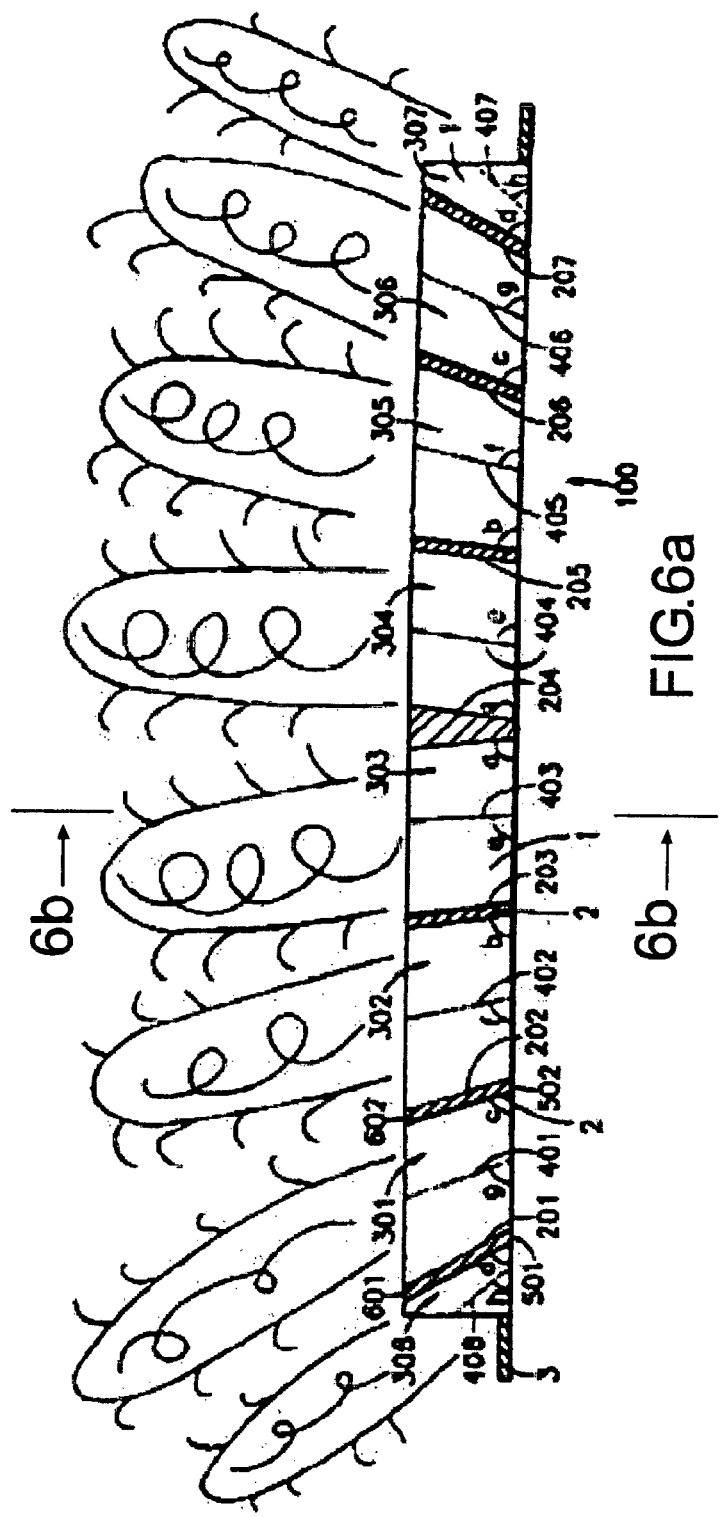
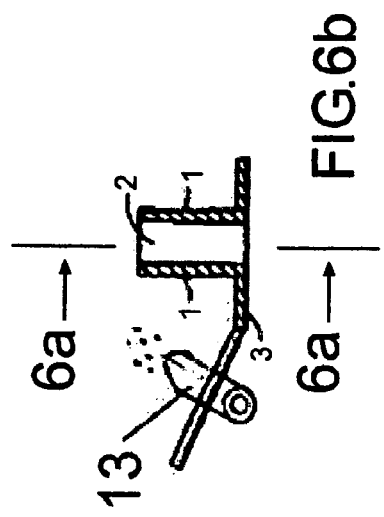

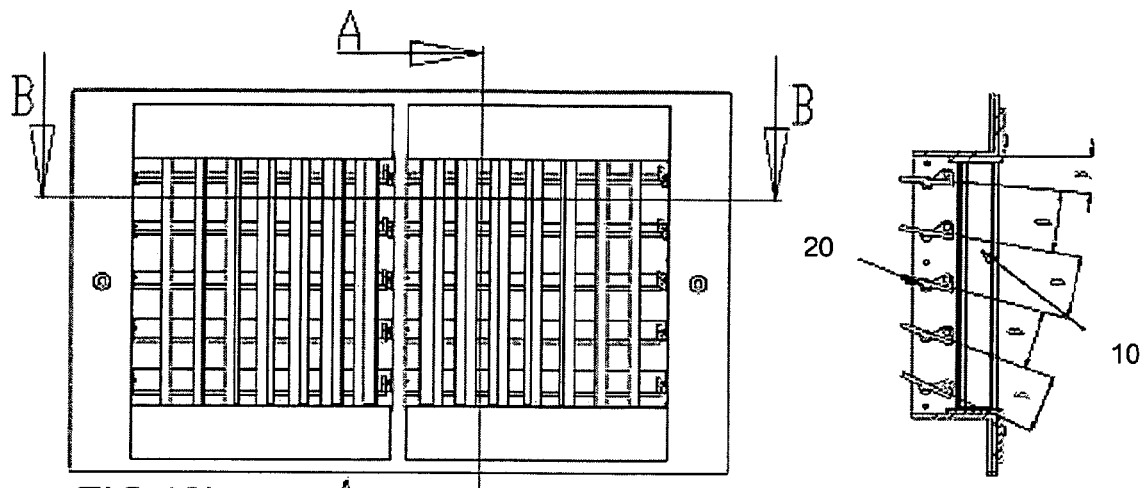
FIG.12b
A-A
FIG.12d
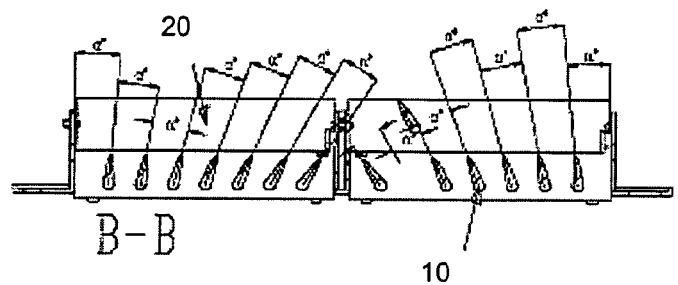
B-B
FIG.12c
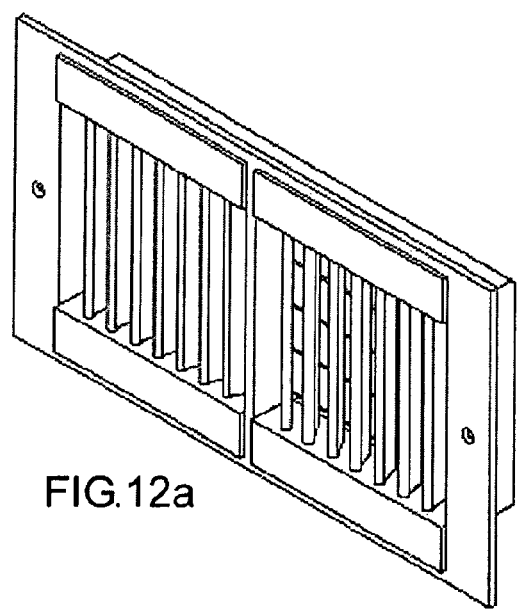
FIG.12a

SECTION A-A

SECTION B-B

SECTION C-C

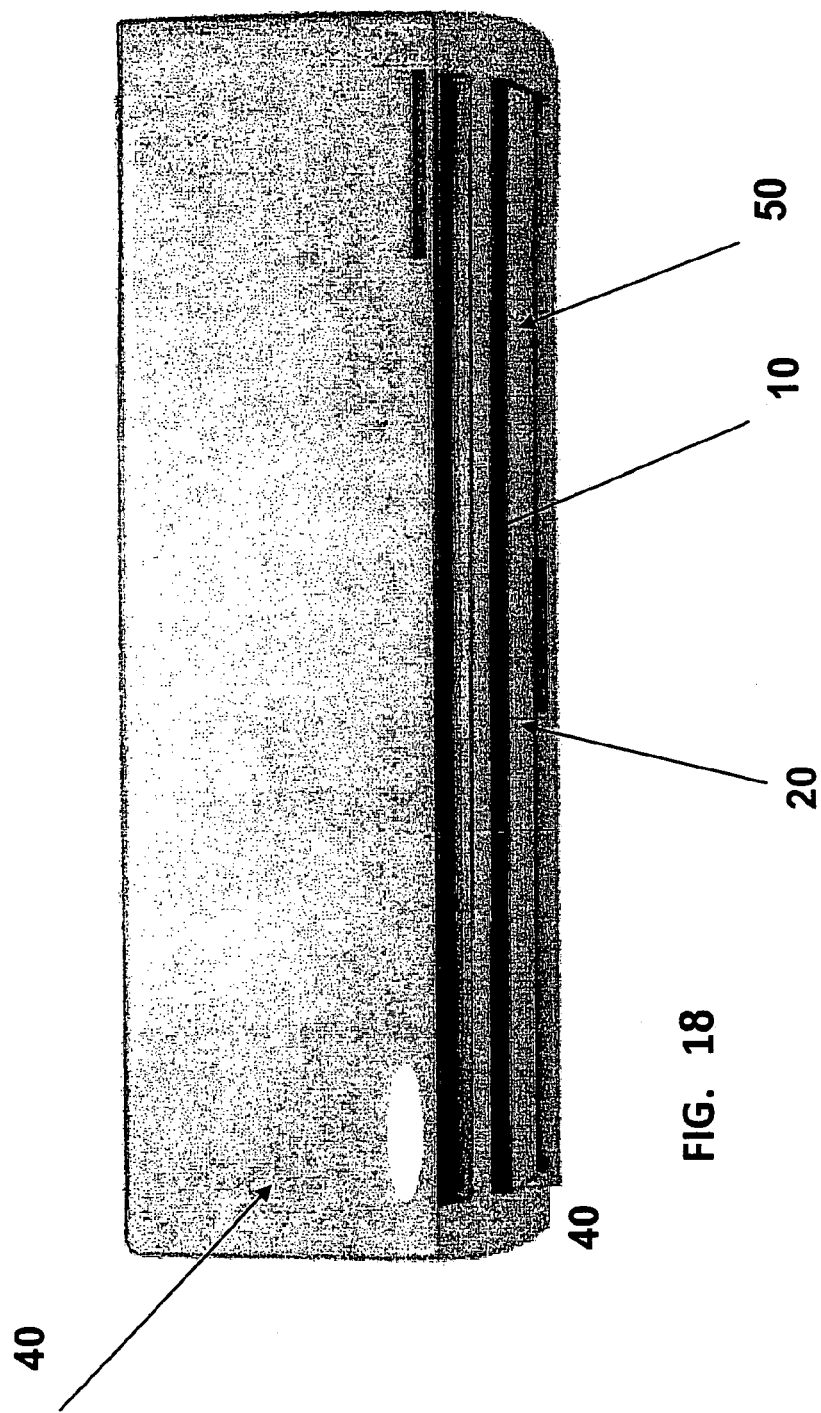

METHOD OF DISPERSING AIR, JETS FROM AIR CONDITIONING SYSTEMS AND MIXING THEM WITH THE AMBIENT AIR OF AN ENCLOSURE FOR BETTER COMFORT AND APPARATUS TO CREATE THE JETS

This application is the United States national phase application of International Application PCT/US08/005079 filed Apr. 21, 2008, which claims benefit of U.S. Provisional Application 60/994,766, filed Sep. 21, 2007.

BACKGROUND OF THE INVENTION

The invention relates to a method and equipment for dispersing the air flowing out of air conditioning systems and mixing it with the ambient air of the enclosure to be conditioned. The quick mixing of the conditioned air jets will create better comfortable feeling of people in front of the conditioned air outlet. Known air outlets from air conditioning systems can be adjusted to different directions and even to automatically changing directions, but direct air flow to the body is inconvenient and directing the air flow off the body will leave the bad feeling of the unconditioned air. It also takes time to change the temperature of the whole volume of an enclosure to feel comfortable at all its entire volume. It is an object of the invention to provide a method and apparatus for dispersing the air flowing out of air conditioning systems and mixing it for better comfortable feeling of people in front of the conditioned air outlet.

SUMMARY OF THE INVENTION

The invention provides a method and equipment for dispersing the air flowing out of air conditioning systems in such a way that the separated air jets will turbulent in different directions, changing the temperature of maximum air volume without the direct feeling of them. The method is using at least one oblong air outlet structure having a plurality of air outlets (301, 302), said outlets being relatively positioned with respect to each other and dimensioned to issue air streams in divergent mutually interacting directions and thereby create whorls, turbulences and pulsations between each adjacent two air streams.

The invention relates to any type of air conditioning system, like autonomous wall mounted systems, like central systems with air outlets along or at the end of ducts, pipes or hoses and like small systems in cars and other moving systems. The invention relates also to flowing turbulent clean air into clean rooms used in the industry, hospitals and in other necessities.

In a preferred embodiment the air outlets are arranged in different directions in 3 dimensions and separated by progressively inclined partitions with different angles to each other.

In another preferred embodiment the air outlets are arranged in different directions in 3 dimensions in lines, in progressively inclined different directions, and several of them are mounted side by side to cover the whole air outlet of air conditioning systems with progressively inclined partitions in different angles to each other.

In another preferred embodiment the air outlets are arranged in different directions in 3 dimensions including progressively inclined partitions and alternate outwardly inclined side wall portions.

In another preferred embodiment the air outlets are arranged in different directions in 3 dimensions and the progressively inclined partitions and side walls are arranged in two or more layers, perpendicular to each other.

In another preferred embodiment the air outlets are arranged in different directions in 3 dimensions and the progressively inclined partitions are arranged in two or more layers, in different angles to each other.

In another preferred embodiment the air outlets are arranged in different directions in 2 dimensions in lines separated by progressively inclined partitions in different angles to each other.

In another preferred embodiment the air outlets are arranged in different directions in 2 dimensions in lines of side walls separated by progressively inclined partitions in different angles to each other and several of them are mounted side by side to cover the whole air outlet of air conditioning systems.

In another preferred embodiment the air outlets are arranged in different directions in 2 dimensions in lines separated by progressively inclined partitions in different angles to each other and several of them are mounted side by side and perpendicular to others to cover the whole air outlet of air conditioning systems.

In another preferred embodiment the air outlets are arranged in different directions in 2 dimensions and arranged in two or more layers of progressively inclined partitions, perpendicular to the layers of the progressively inclined side walls.

In another preferred embodiment the air outlets are arranged in different directions in 2 dimensions and arranged in two or more layers of progressively inclined partitions, in different angles to each other.

In another preferred embodiment the air outlets are arranged in different directions in 2 or 3 dimensions and arranged in two or more layers of progressively inclined partitions, in different angles to the layers of the progressively inclined side walls where each layer of the partitions and side walls can be directed manually to a desired direction, while keeping the different angles between each one of them.

In another preferred embodiment the air outlets are arranged in different directions in 2 or 3 dimensions and arranged in two or more layers of progressively inclined partitions, in different angles to the layers of the progressively inclined side walls where each layer of the partitions and side walls can be directed automatically to a desired direction, while keeping the different angles between each one of them.

In another preferred embodiment the air outlets are arranged in different directions in 2 or 3 dimensions and arranged in two or more layers of progressively inclined partitions, in different angles to the progressively inclined side walls where each layer of the partitions and side walls can be directed manually to a desired direction, while keeping the different angles between each one of them with the help of an adjustable connecting rod and fixed pivot to each partition.

In another preferred embodiment the air outlets are arranged in different directions in 2 or 3 dimensions and arranged in two or more layers of progressively inclined partitions, in different angles to the progressively inclined side walls where each layer of the partitions and side walls can be directed automatically to a desired direction, while keeping the different angles between each outlet with the help of an adjustable connecting rod and fixed pivot to each partition.

In another preferred embodiment the air outlets, made by the progressively inclined partitions and side walls, are arranged in different directions and are moveable as a whole arrangement in different directions.

In another preferred embodiment the air outlets are arranged in different directions in two layers of progressively inclined partitions and side walls, and are moveable as a whole arrangement in different directions.

In another preferred embodiment the air outlets of any arrangement of the progressively inclined partitions and side walls are mounted over an existing type of air outlets of air conditioning systems.

In another preferred embodiment the air outlets of progressively inclined partitions and side walls are mounted over an existing grille type of air outlets of air conditioning systems.

In another preferred embodiment the air outlets of any arrangement of the progressively inclined partitions and side walls are mounted over an existing type of air outlets of air conditioning systems and the partitions and/or side walls can be operated to close the outlet when the system shut down.

In another preferred embodiment the air outlets of any arrangement of the progressively inclined partitions and side walls are mounted over an existing type of air outlets of air conditioning systems with air shutters, or gates at the rear of the air outlets.

In another preferred embodiment the air outlets of any arrangement of the progressively inclined partitions and side walls are mounted over an existing type of air outlets of air conditioning systems with air shutters in front of the air outlets.

In another preferred embodiment the air outlets of any arrangement of the progressively inclined partitions and side walls are mounted over an existing type of air ducts of air conditioning systems of vehicles, land, sea or air ones.

In another preferred embodiment a fogging nozzle is mounted at the air outlets to create small droplets in order to add moisture to the conditioned air.

BRIEF DESCRIPTION OF THE DRAWINGS

FIG. 2b is an exploded perspective view of one layer of the air outlet structure of FIG. 2a.

FIG. 6a is a longitudinal section, taken along line 6a-6a in FIG. 6b, of a dispersing and mixing air outlet structure showing air outlets emitting turbulent pulsating air streams from progressively endwardly inclined partitions.

FIG. 6b is a section along line 6b-6b of FIG. 6a with a fogging nozzle at the side of the dispersing air outlet structure.

FIG. 12a is a perspective view of an air outlet structure with several parallel side walls in one layer and progressively inclined partitions in a second layer with the side walls are progressively inclined to each other.

FIG. 12b is a front view of the air outlet structure of FIG. 12a.

FIG. 12c is a cross section of FIGS. 12a and 12b at line B-B

FIG. 12d is a cross section of FIGS. 12a and 12b at line A-A

DETAILED DESCRIPTION

Figure 1:
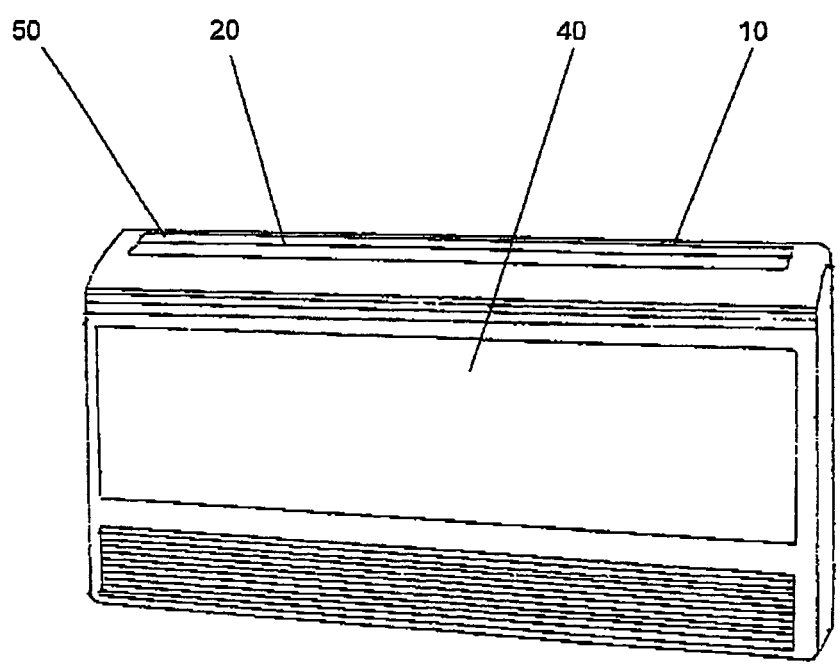
FIG. 1 is a perspective view of a stand alone air conditioning system with an air outlet structure with progressively inclined partitions in different directions in each row with the side walls of each row progressively inclined to each other.

FIG. 1 is a perspective view of a stand alone air conditioning system 40 with an air outlet structure 50 with progressively inclined partitions in different directions in each row with the side walls of each row progressively inclined to each other.

Figure 2B:
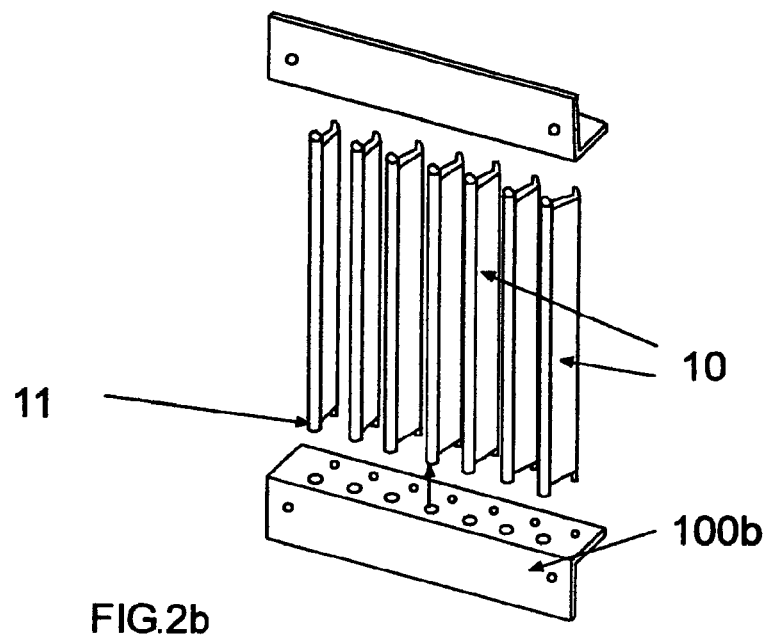
Figure 2A:
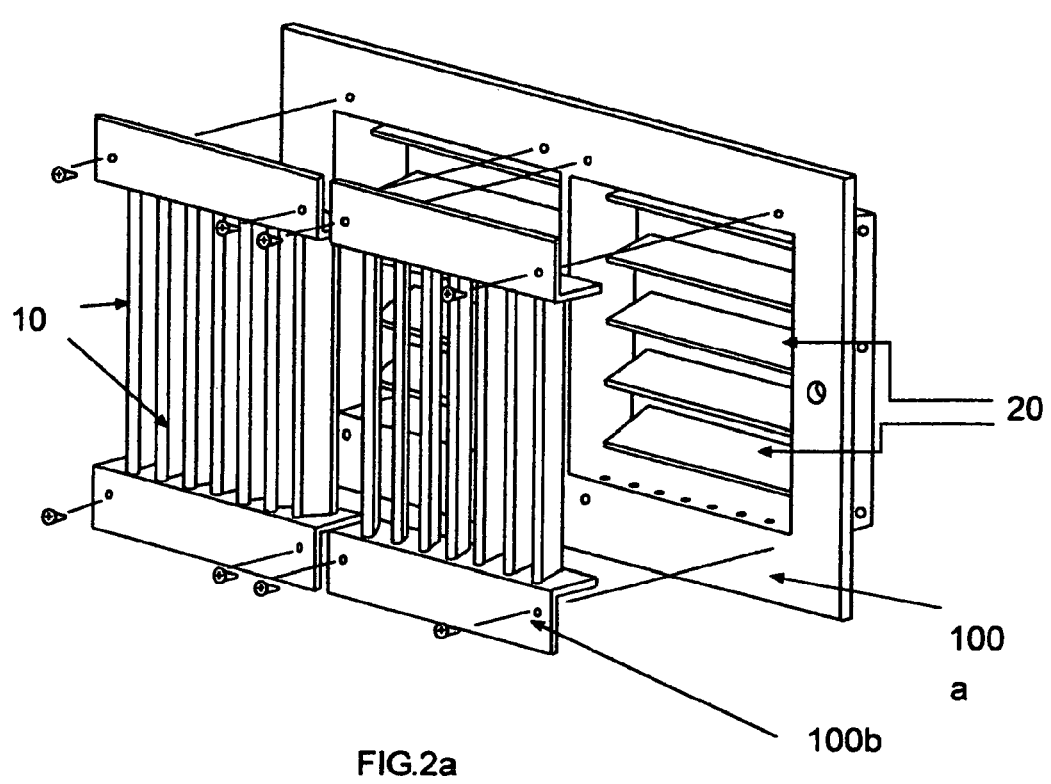
FIG. 2a is a perspective view of an air outlet structure with two layers of adjustable air directors perpendicular to each other.

FIG. 2a is a perspective view of an air outlet structure with two layers of adjustable air directors 100a and 100b perpendicular to each other, the angle between each two directors is approximately constant as they are pivoted to the main structures and connected by a rod to change the direction the whole set.

FIG. 2b is a perspective blown view of one layer an of the air outlet structure 100b of FIG. 2a with the adjustable air directors (or partitions) 10 pivoted to the main structures and connected by a rod (not shown) with the pins 12 to change the direction the whole set and maintain approximately the same angle between each two of them.

Figure 3:
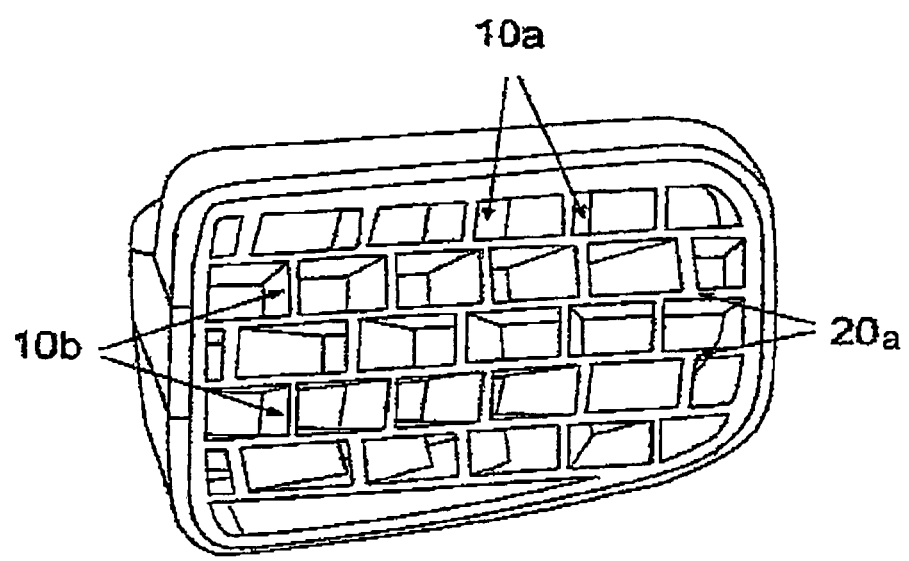
FIG. 3 is a perspective view of an air outlet structure with several progressively inclined parallel side walls 20 with progressively inclined partitions 10 between them in different directions in each row as is designed for a vehicle, the structure can be mounted with axes to let it been directed to different directions, a back shutter, if exist can lock the air flow.

FIG. 3 is a perspective view of an air outlet structure with several progressively inclined walls 20a with progressively inclined partitions 10 between them in different directions in each row, 10a are progressively directed to the left and 10b is progressively directed to the progressively directed to the right, and the side walls 20a are progressively inclined downward, as is designed for a vehicle. Each side wall 20a has two faces which are parallel to one another. The structure can be mounted with axes to let it been directed to different directions, a back shutter, if exist can lock the air flow.

Figure 4:
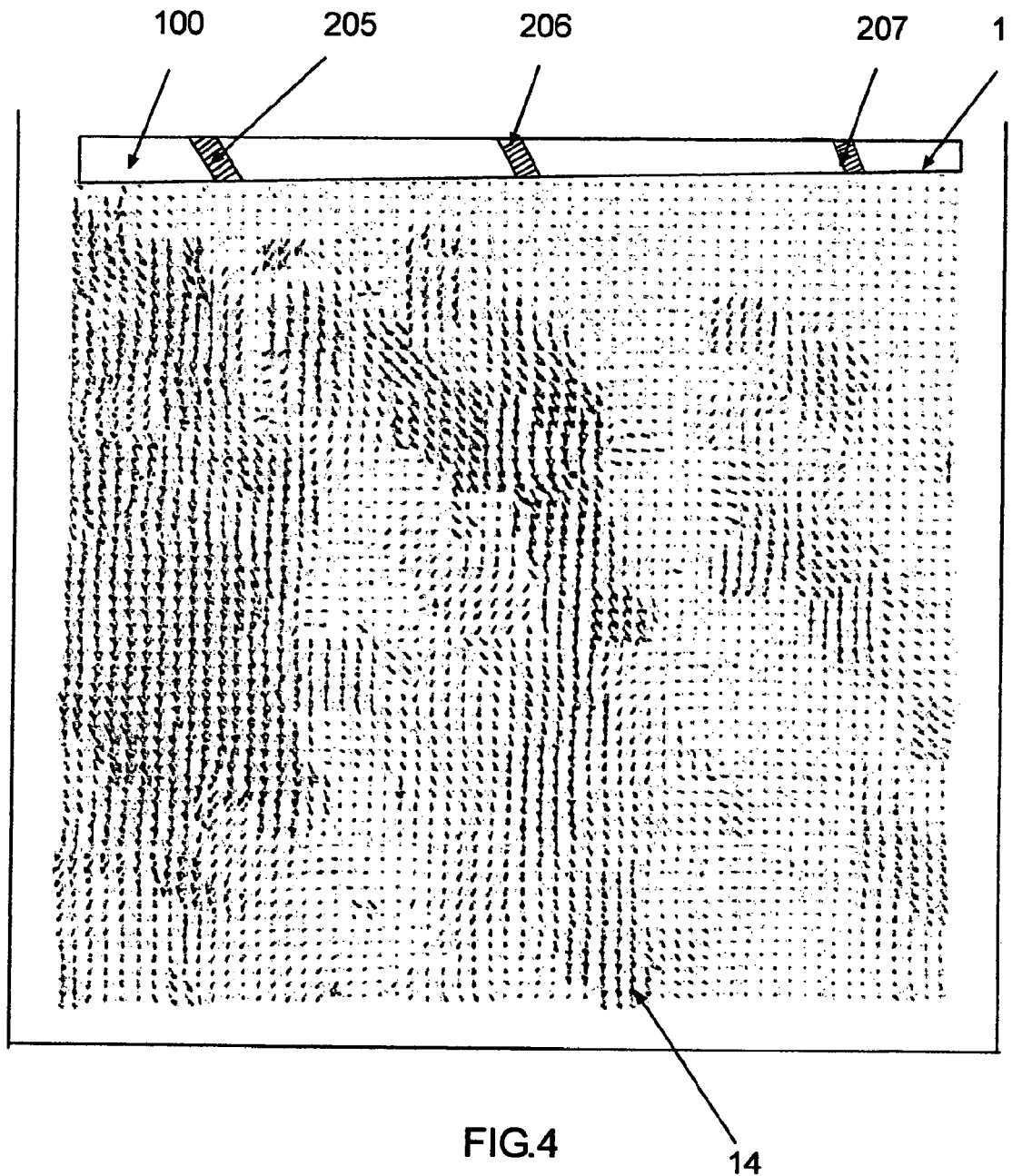
FIG. 4 is a two-dimensional velocity vector-field close to a part-section of a dispersing air outlet showing the turbulence effect.

FIG. 4 is a two-dimensional velocity vector-field close to a part-section 100 of a dispersing air outlet showing the turbulence effect caused by the partition walls 205, 206, 207 at the side wall 1. The arrows 14 present the imposing of the 3 dimensional air velocity as the length of the arrows and the direction of the moving air at each point. It is clear that the air flowing out of the air outlet 100 is highly turbulent at all directions.

Figure 5:
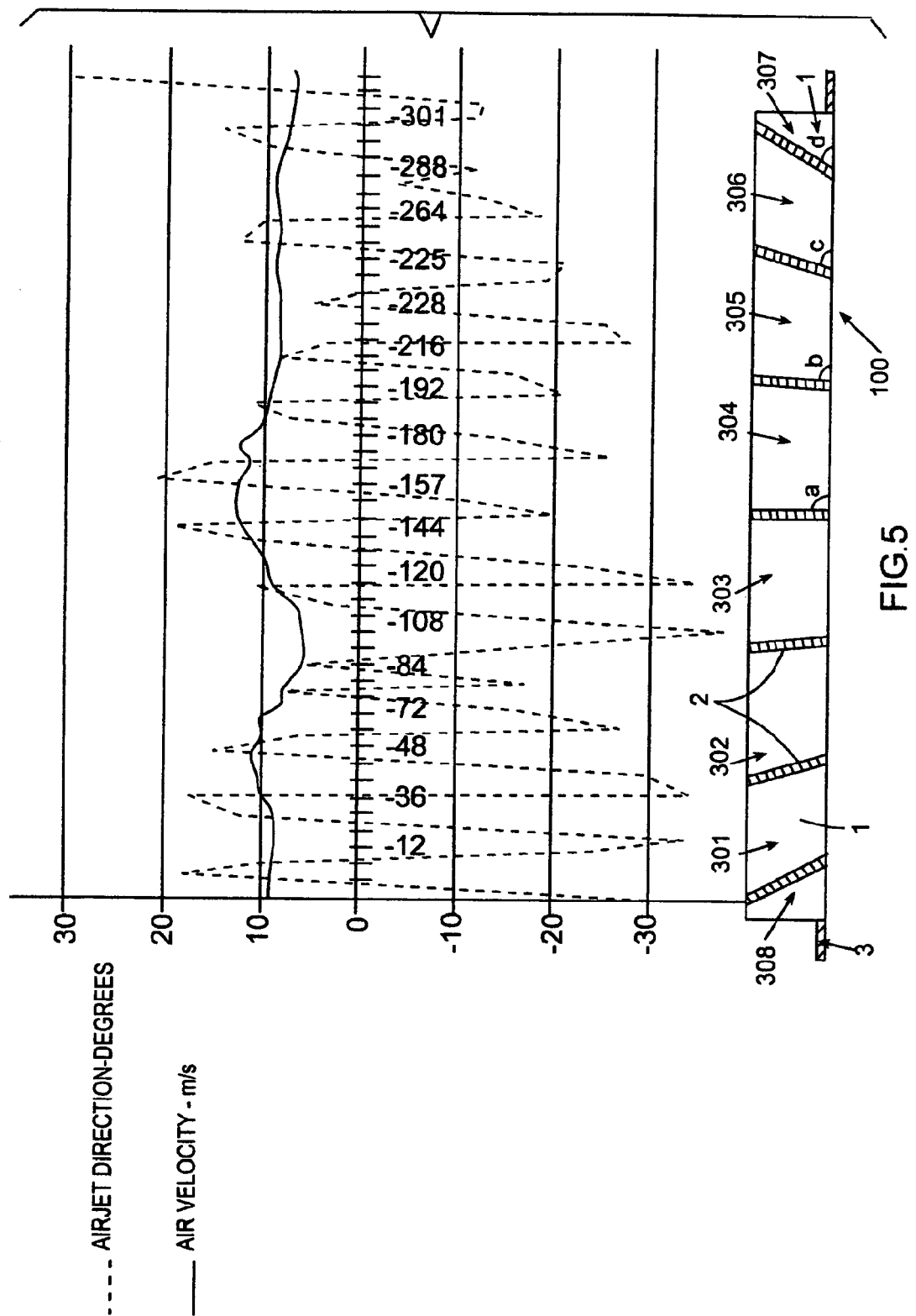
FIG. 5 shows the air outlet structure of FIG. 6a and a diagram of measured air velocities and air jet directions along the length of the entire air outlet structure.

FIG. 5 shows the air outlet structure of FIG. 6a and a diagram of measured air velocities and air jet directions along the length of the entire air outlet structure.

FIG. 6a is a longitudinal section, taken along line 6a-6a in FIG. 6b, of a dispersing air outlet structure showing air outlets emitting turbulent pulsating air streams from progressively endwardly inclined air outlets.

FIG. 6b is a cross section along line 6b-6b of FIG. 6a with a fogging nozzle 13 at the side of the dispersing air outlet structure.

FIGS. 6a, 6b and 5 show a preferred embodiment of an air outlet structure 100 according to the present invention. Turbulent pulsating air streams are issued from air outlets 303, 302, 301 which are of progressively greater end ward inclination toward the left end of the outlet structure and which each have an increasing cross section from an air inlet side extending outwardly. That is, air outlet 301 is more leftward inclined than air outlet 302, which in turn is more leftward inclined than air outlet 303, and the cross section of air outlet 301, for example, increases from the air inlet side, where the cross section is defined by the distance between points 501 and 502, to the air outlet side, where the cross section is defined by the distance between points 601 and 602. Air outlets 304, 305, 306 similarly have progressively greater end ward inclination toward the right end of the outlet structure 100, and each has an increasing cross section from an air inlet side extending outwardly. Due to the diverging direction of adjacent air streams and to diffuser action, whorls are created between each adjacent two air streams which effect substantially continuous change in flow direction (e.g., turbulence) and flow velocity (e.g., pulsation) as measured and recorded in FIG. 5. The turbulence of the air jets creates a mixing effect with the ambient air in front and sides of the air outlet structure.

FIGS. 6a and 6b show an outlet structure 100 which includes two parallel longitudinal side walls 1 and several partitions 2 connected between opposing side walls 1. A flange 3 surrounds an air inlet opening at the bottom of the structure. The flange 3 serves as a mounting flange to couple the air inlet opening to an air duct or an outlet of an air conditioning system as will be described herein below. Any other connecting means can be used to couple the air inlet opening to an air duct or an outlet of an air conditioning system.

In the example shown in FIGS. 6a and 6b, seven partitions 201-207 extend between the opposed longitudinal side walls 1. The partitions 2 are progressively inclined toward the ends of the structure with respect to each other on both sides of a central upright prism shaped partition as shown by progressively decreasing angles a, b, c, d. A central, prism shaped, partition wall 204 is substantially perpendicular to the two longitudinal side walls 1 and partition walls 203, 202, 201 and 205, 206, 207 are progressively endwardly inclined at respective angles b, c, and d as shown in FIG. 6a. Angle a as shown in FIG. 6a is preferably smaller than 90 degrees. The angles b, c, and d at which the partition walls are progressively endwardly inclined may decrease by increments of about 10 degrees, or in a range of from about 1-20 degrees, 6-30 degrees, and 15-45 degrees, respectively. For example, angles b, c, and d may be 80, 70 and 60 degrees, respectively. If an additional partition wall is provided on each end of the air outlet structure, the angle of inclination of such additional partition walls may decrease by a further increment of about 10 degrees, or in a range from about 20-60 degrees. If still further partition walls are provided, the angle of inclination of such further partition walls may decrease by further increments.

As shown in FIG. 6a, a row of air outlets each having respective axes 401-406 which are progressively endwardly inclined with respect to an adjacent air outlet is thus formed. End air outlets 307, 308 with respective axes 407, 408 are also provided. The axis of each air outlet is shown by a dotted line in FIG. 6a, and angles e-h indicate the angles of inclination of the axes, as shown in FIG. 6a. Specifically, the axis of a given air outlet (except the outermost air outlets 307, 308) is defined as a plane running between the two longitudinal side walls defining the air outlet at an angle to the central partition wall 204 that is about midway between the angle at which each of the adjacent partition walls defining such air outlet is inclined with respect to the central partition wall 204. For example, the air outlet defined by adjacent partition walls 205 and 206 has an axis 405 defined by a plane running between longitudinal side walls 1 at an angle f that is about midway between the angles b and c at which partition walls 205 and 206 are respectively inclined with respect to central partition wall 204. It should be noted that the respective outermost air outlets 307, 308 may be open on their ends and may be defined by just one partition wall, 207 and 201, respectively. In such case, the axis of each such outermost air outlet 307, 308 is defined by a plane running between longitudinal side walls 1 and an angle a that is about somewhere between 1 degrees and the angle d at which the outermost partition wall, 207 or 201, is formed with respect to the central partition wall 204.

As shown in FIG. 6a, the cross section of each air outlet increases extending outwardly from the air inlet opening on the air inlet side towards the open environment, as defined by the top of the outlet structure. For example, the cross section of air outlet 301 increases from the air inlet side, where the cross section is defined by the distance between points 501 and 502, to the air outlet side, where the cross section is defined by the distance between points 601 and 602.

Also as shown in FIG. 6a, the partition walls 2 separating each adjacent air outlet may also be spaced progressively closer together toward the respective outermost ends of the air outlet structure so that the cross section of successive adjacent air outlets decreases from the central portion of the air outlet structure to the respective outermost ends thereof. (See, for example, the decreased cross sections of outermost air outlets 408 and 407.)

Instead of providing the air outlet structure with air outlets each having respective axes which are progressively endwardly inclined with respect to the adjacent air outlet as shown in FIGS. 6a,6b and 5, it is also possible to provide an air outlet structure having adjacent air outlets whose axes are endwardly inclined in opposing directions and/or at increasing and decreasing angles of inclination. That is, adjacent air outlets on each side of the air outlet structure may have axes that are endwardly inclined at increasing and decreasing angles of inclination in the same end ward direction, and/or the air outlet structure may have adjacent air outlets whose axes are endwardly inclined in alternating end ward directions. The critical feature is that the air outlet structure issues turbulent pulsating air streams in diverging directions.

Figure 7:
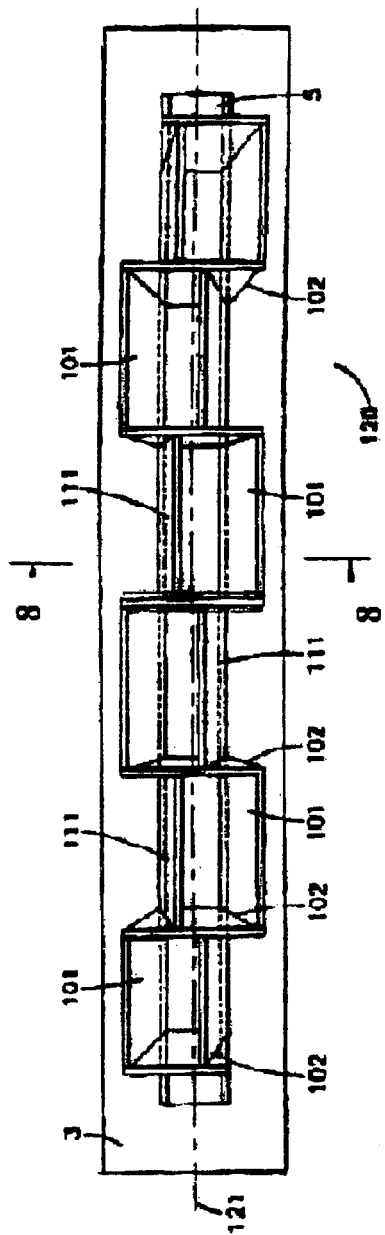
FIG. 7 is a top view of an air outlet structure including progressively inclined partitions and alternate outwardly inclined side wall portions.

FIG. 7 is a top view of an air outlet structure including progressively inclined partitions and alternate outwardly inclined side wall portions.

Figure 8:
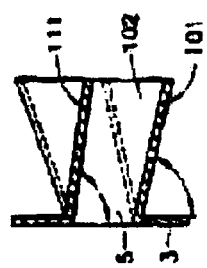
FIG. 8 is a cross section of the air outlet structure shown in FIG. 7 taken along line 8-8 in FIG. 7.

FIG. 8 is a cross section of the air outlet structure shown in FIG. 7 taken along line 8-8 in FIG. 7.

Still further, instead of providing the outlet structure with two parallel longitudinal side walls 1 (as shown in FIGS. 6a, 6b and 5) it is also possible to form the side walls in a "zigzag" fashion, as shown in FIGS. 7 and 8, thereby also extending the air outlets sideways in alternate order. The air outlet structure 120 shown in FIGS. 7 and 8 includes air outlets which, in addition to diverging from each other endwardly along the structure (as in FIG. 6a), extend sideward to the right and the left from a center line. The structure includes a rectangular oblong inlet opening 5 surrounded by a flange 3, progressively endwardly inclined transverse partitions 102 and pairs of longitudinal side wall portions 101 and 111 which are alternately inclined in opposite directions to the right and to the left from an imaginary center line in FIG. 8. Since the center line extends horizontally in FIG. 8, the pairs of longitudinal side wall portions 101, 111 are alternately sideward inclined as seen in FIG. 8. In this embodiment, the air outlets are thus both endwardly and sideward inclined, causing the turbulence and pulsation of the emerging air streams to further increase.

As shown in FIG. 8, the sideward angles of inclination of the longitudinal sidewall portions 101 and longitudinal side wall portions 111 comprising each pair of longitudinal side wall portions may differ. For example, the sideward angle of inclination of longitudinal side wall portion 101 may be about 70.degree, from the imaginary center line and the sideward angle of inclination of longitudinal side wall portion 111 may be about 80.degree, from the imaginary center line.

Figure 9:
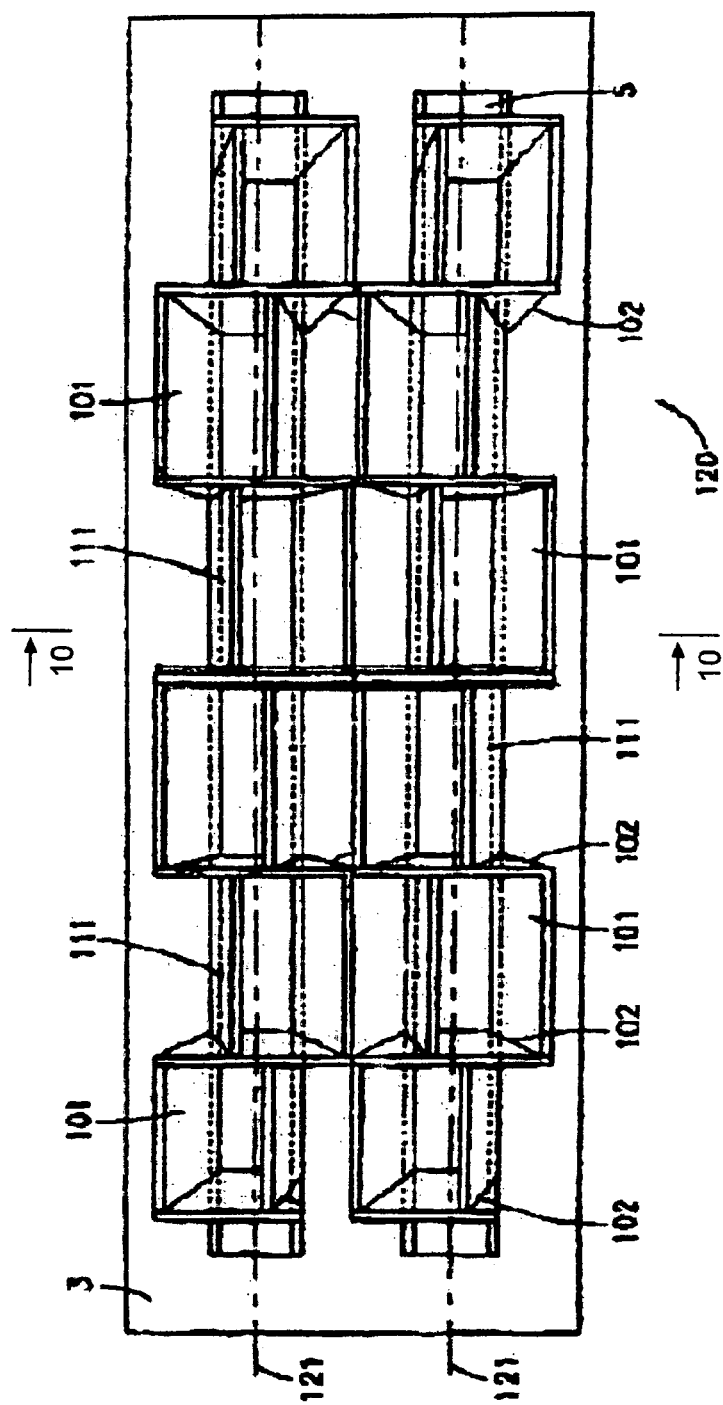
FIG. 9 is a top view of two air outlet structures as in FIG. 7, mounted together at an air outlet of an air conditioning system.

FIG. 9 is a top view of two air outlet structures 120 as in FIG. 7, mounted together at an air outlet of an air conditioning system in order to get larger area for larger air flow.

Figure 10:
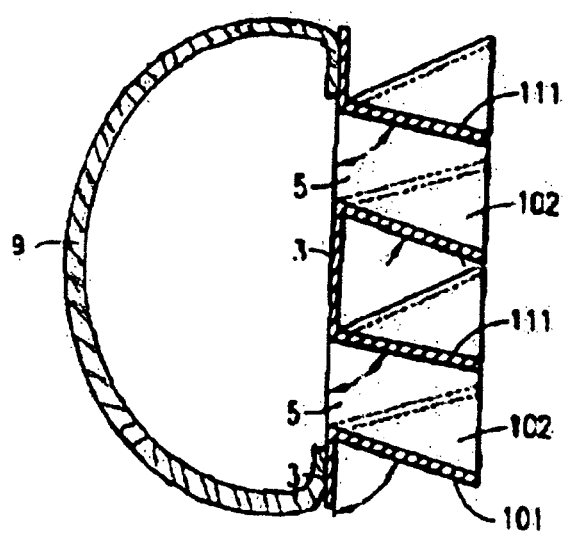
FIG. 10 is a cross section of the dispersing air outlet structure shown in FIG. 9 taken along line 10-10 in FIG. 9 and mounted at an outlet of an air-conditioning system.

FIG. 10 is a cross section of the dispersing air outlet structure shown in FIG. 9 taken along line 10-10 in FIG. 9 and mounted at an outlet of an air-conditioning system with air duct 9.

Figure 11:
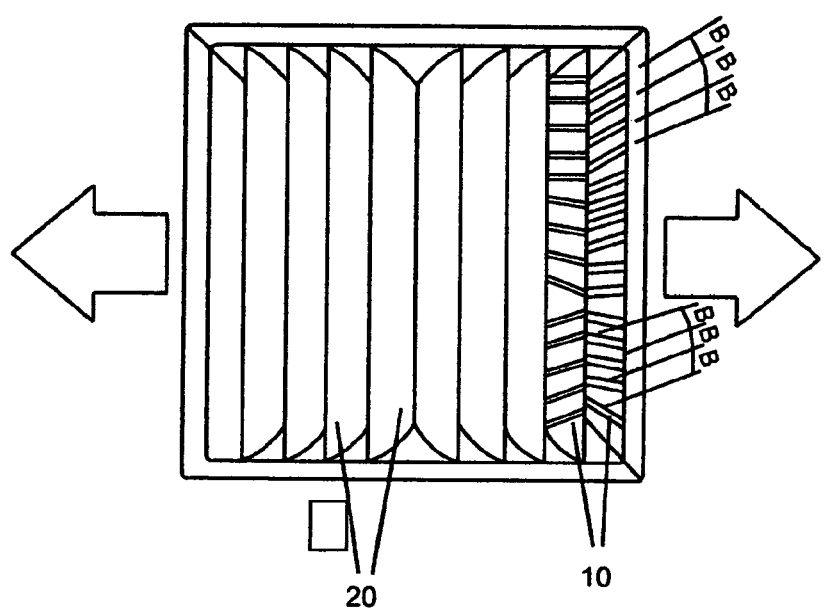
FIG. 11 is a front view of an air outlet structure directing the air in two directions at progressively inclined directions and progressively inclined partitions between them.

FIG. 11 is a front view of an air outlet structure directing the air in two directions at progressively inclined directions of the side walls 20 and progressively inclined partitions 10 between them, the progressively inclined partitions 10 are at different direction in each second row with an angle β between each other. The turbulent air jets are flowing out as in FIG. 6a.

FIG. 12a is a perspective view of an air outlet structure with several parallel side walls in one layer and progressively inclined partitions in a second layer with the side walls are progressively inclined to each other.

FIG. 12b is a front view of the air outlet structure of FIG. 12a.

FIG. 12c is a cross section of FIGS. 8a and 8b at line B-B, with the front layer of partitions 10 are progressively inclined to each other at an angle α and the rear side walls 20 are progressively inclined to each other at an angle α.

FIG. 12d is a cross section of FIGS. 8a and 8b at line A-A, with the front layer of partitions 10 and the rear side walls 20 are progressively inclined to each other at an angle β.

Figure 13:
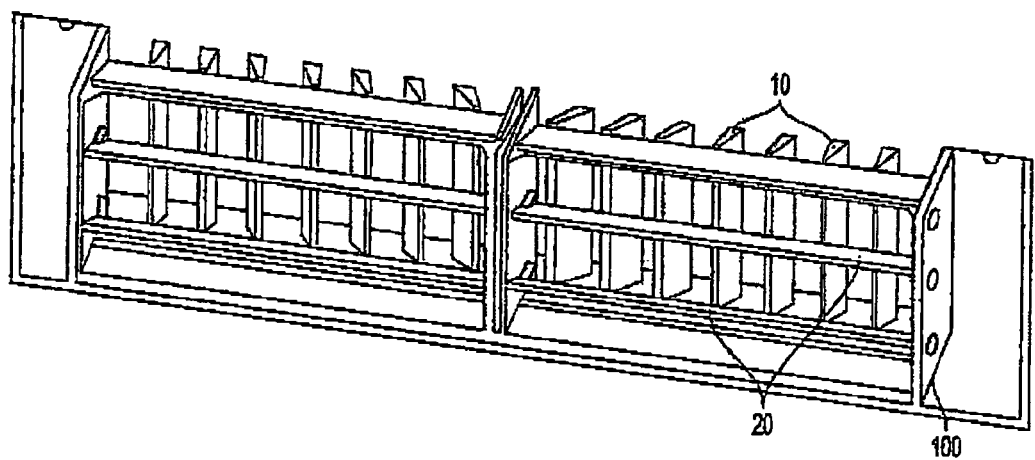
FIG. 13 is a perspective view of a cross-section of an air outlet structure 100 with several parallel side walls 20 as a front layer with progressively inclined partitions 10 as a rear layer with the side walls 20 progressively inclined to each other, and both are connected by a control rod.

FIG. 13 is a perspective view of a cross-section of an air outlet structure 100 with several parallel side walls 20 as a front layer with progressively inclined partitions 10 as a rear layer with the side walls 20 at the front layer progressively inclined to each other, and both are connected by control rods (not shown).

Figure 14A:
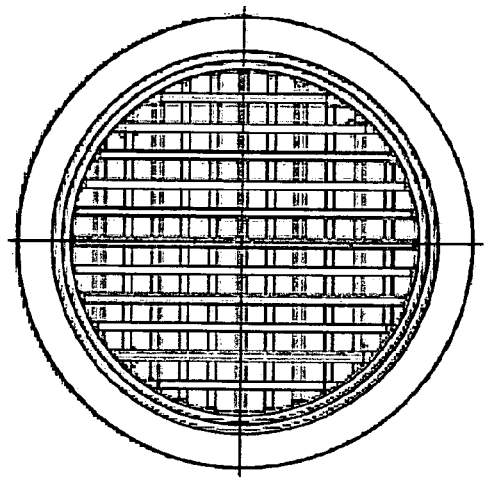
FIG. 14a is a front view of an air outlet structure with a circular shape directing the turbulent air jets at progressively inclined directions of the front layer of side walls and progressively inclined partitions in the rear layer.

FIG. 14a is a front view of an air outlet structure with a circular shape directing the turbulent air jets in at progressively inclined directions of the front layer of side walls and progressively inclined partitions in the rear layer.

Figure 14B:
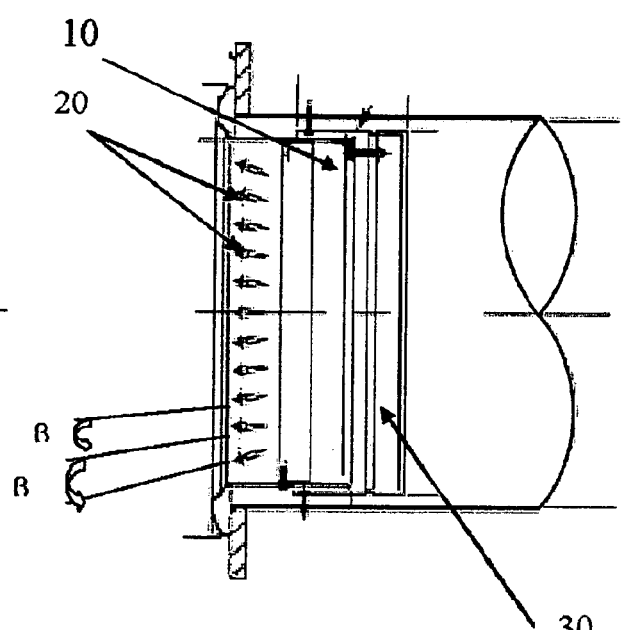
FIG. 14b is a cross section of the dispersing air outlet structure shown in FIG. 14a showing the two layers of side walls and partitions and a shutter at their back.

FIG. 14b is a cross section of the dispersing air outlet structure shown in FIG. 14a showing the two layers of side walls 20 at the front, partitions 10 at the rear and a shutter 30 at their back. The angle between each two close side walls 20 is β.

Figure 15B:
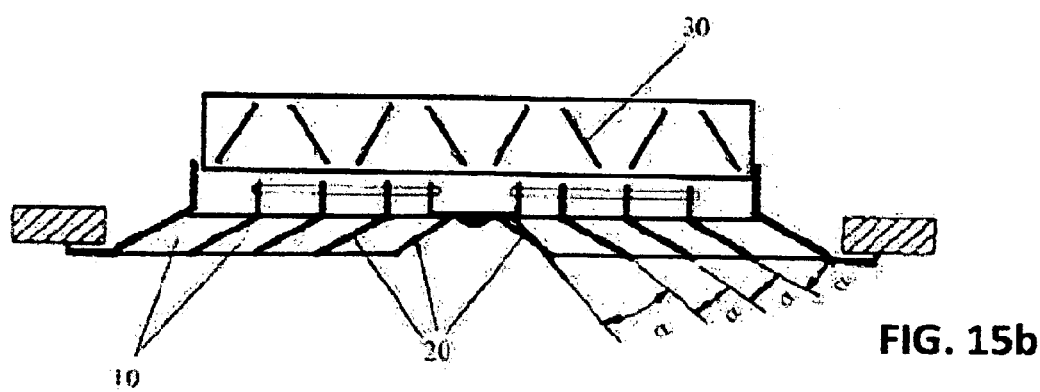
FIG. 15b is a cross-section an air outlet structure with several straight side walls 20 with progressively inclined partitions 10 between them and the side walls 20 are progressively inclined to each other and shutters 30 at the back.
Figure 15A:
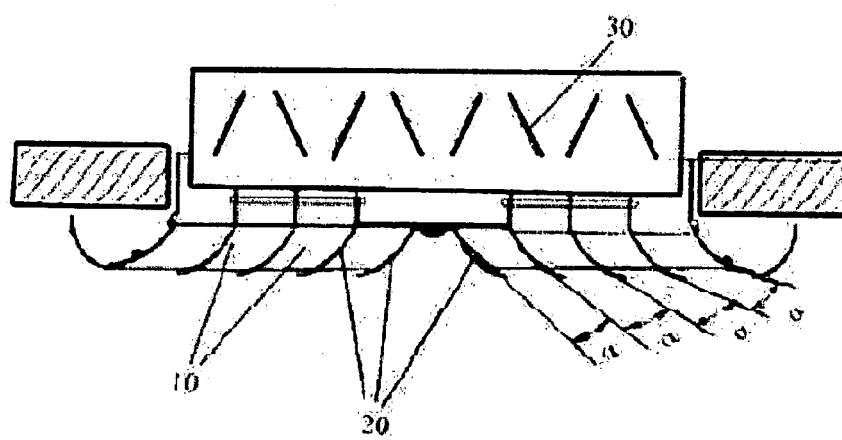
FIG. 15a is a cross-section an air outlet structure with several curved side walls 20 with progressively inclined partitions 10 between them and the side walls 20 are progressively inclined to each other and shutters 30 at the back.

FIG. 15a is a cross-section of an air outlet structure with several curved side walls 20 with progressively inclined partitions 10 between them and the side walls 20 are progressively inclined to each other with angle α between them and shutters 30 at the back.

FIG. 15b is a cross-section of an air outlet structure with several straight side walls 20 with progressively inclined partitions 10 between them and the side walls 20 are progressively inclined to each other with angle β between them and shutters 30 at the back.

Figures 16A, 16B, 16C, 16D, 16E:
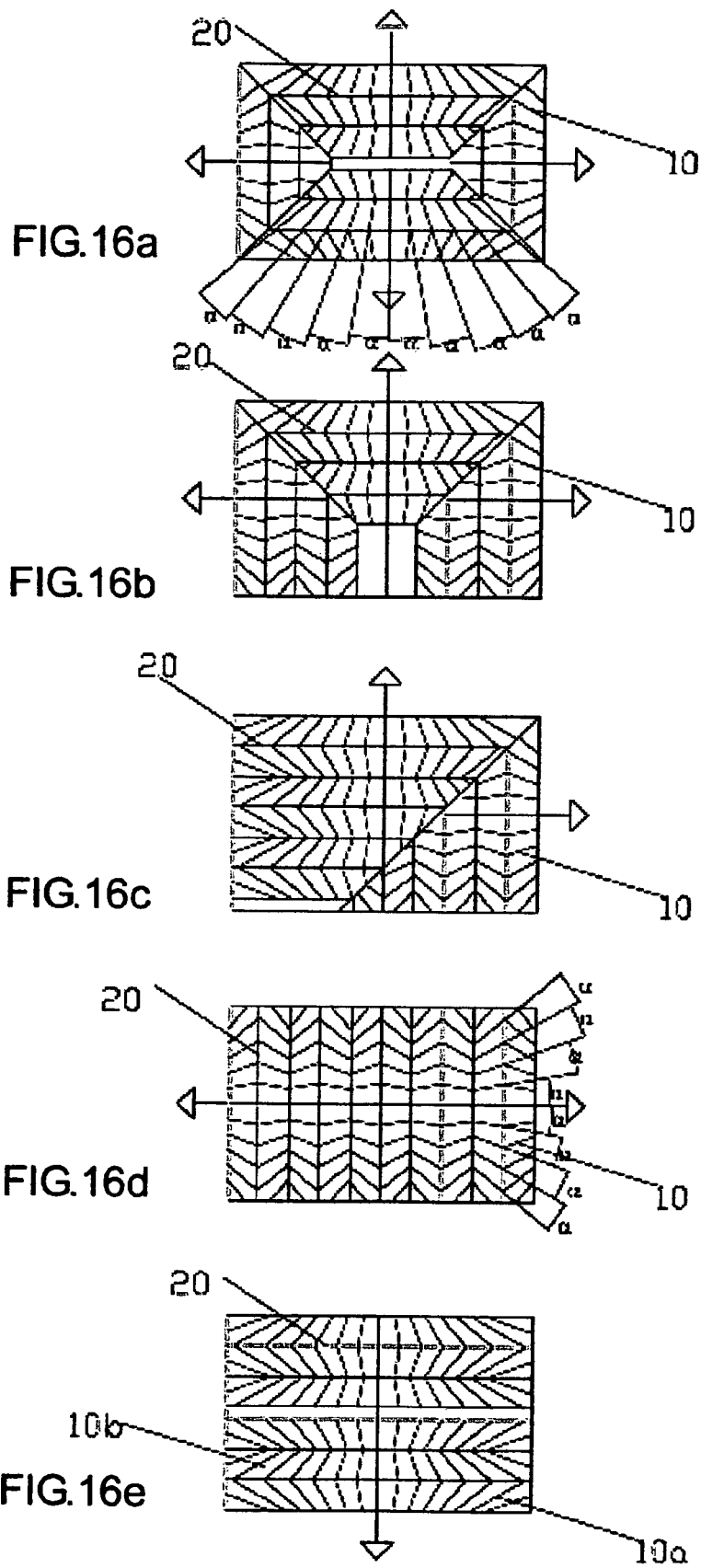
FIG. 16 are front views of air outlet structures with different directions of the turbulent air jets where the side walls are arranged in different directions and are progressively inclined to each other with progressively inclined partitions 10 between them.

FIG. 16 are front views of air outlet structures with different directions of the turbulent air jets where the side walls 20 are arranged in different directions and are progressively inclined to each other with progressively inclined partitions 10 between them. 16a has 4 directions of turbulent air jets. 16b has two opposite directions and one perpendicular direction of turbulent air jets. 16c has two perpendicular directions of turbulent air jets. 16d has two opposite directions of turbulent air jets. 13e has one direction of turbulent air jets.

Figure 17A:
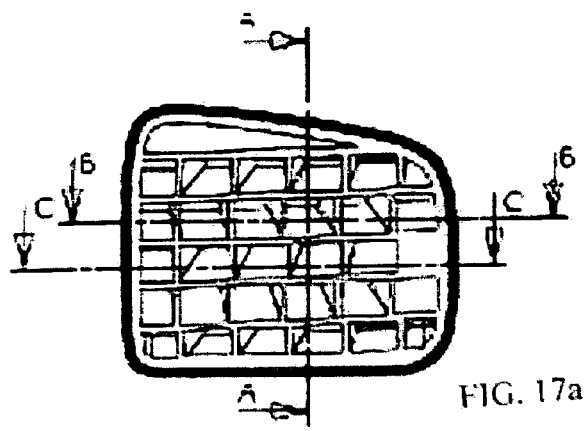
FIG. 17a is a front view of the air outlet structure of FIG. 3.

FIG. 17a is a front view of the air outlet structure of FIG. 3.

Figure 17D:
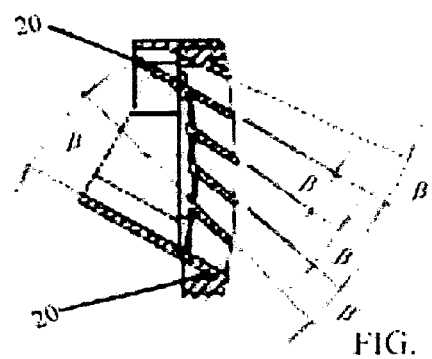
FIG. 17d is a cross section of the dispersing air outlet structure shown in FIG. 17a along line A-A.
Figure 17B:
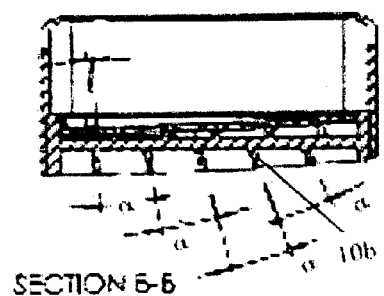
FIG. 17b is a cross section of the dispersing air outlet structure shown in FIG. 17a along line b-b.

FIG. 17b is a cross section of the dispersing air outlet structure shown in FIG. 17a along line B-B. The partitions 10b are progressively directed to the right with an angle a between each two close partitions.

Figure 17C:
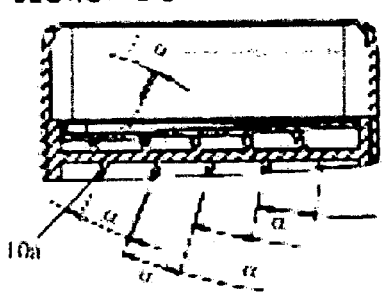
FIG. 17c is a cross section of the dispersing air outlet structure shown in FIG. 17a along line C-C with the progressively inclined partitions directed to the other direction of the progressively inclined partitions of FIG. 17b.

FIG. 17c is a cross section of the dispersing air outlet structure shown in FIG. 17a along line C-C with the progressively inclined partitions directed to the left with an angle α between each two close partitions.

FIG. 17d is a cross section of the dispersing air outlet structure shown in FIG. 17a along line A-A. The side walls 20 are progressively directed downward at an angle β between each two close side walls.

The invention claimed is:
1. An air outlet structure for dispersing air flowing out of an opening of a duct of an air conditioning system, comprising:
   a first set of walls, wherein said first set of walls includes more than two side walls, in serially adjacent relationship; and
   a second set of walls, wherein said second set of walls includes more than two partition walls, in serially adjacent relationship;
   wherein said first and second sets of walls are arranged such that said side walls and said partition walls cooperate to form a plurality of air outlets mounted side by side at the opening of the duct to create a grille of air outlets, each said air outlet being defined at least by the cooperation between two of said side walls and two of said partition walls, and
   wherein more than two of said side walls are inclined at different first inclinations to one another with respect to a first axis and more than two of said partition walls are inclined at different second inclinations to one another with respect to a second axis, said second axis extending along a direction different from said first axis.

2. The air outlet structure according to claim 1, wherein, in operation, turbulent air jets exit the air outlet structure via the air outlets.

3. The air outlet structure according to claim 1, wherein a sideward angle of inclination of one of said partition walls differs from a sideward angle of inclination of the adjacent said partition wall between adjacent said side walls.

4. The air outlet structure according to claim 1, wherein said grille of air outlets is arranged so as to be movably mounted to the opening of the duct so as to enable an angular disposition between the grille and the opening to be changed along an up and down direction or along a side-ways direction.

5. The air outlet structure according to claim 1, wherein said grille of air outlets is arranged so as to be movably mounted to the opening of a land sea, or air vehicle air conditioning system so as to enable an angular disposition between the grille and the opening to be changed along an up and down direction or along a side-ways direction.

6. The air outlet structure according to claim 1, wherein said grille of air outlets is arranged so as to be movably mounted to the opening of an air conditioning system so as to enable an angular disposition between the grille and the opening to be changed along an up and down direction or along a side-ways direction.

7. The air outlet structure according to claim 6, wherein said plurality of air outlets have rear mounted shutters.

8. The air outlet structure according to claim 6, wherein said side walls or said partition walls are used as said shutters.

9. The air outlet structure according to claim 1, wherein each side wall in said first set of walls has two adjacent faces that are in adjacent relationship one with another, and extend along said second axis.

10. The air outlet structure according to claim 1, wherein each partition wall in said second set of walls has adjacent partition walls that are in adjacent relationship one with another, and extend along said first axis.

11. The air outlet structure according to claim 1, wherein said first axis is orthogonal to said second axis.

12. The air outlet structure according to claim 1, wherein said first axis is along a transverse direction and said second axis is along a longitudinal direction.

13. The air outlet structure according to claim 12, wherein said side walls in at least a portion of said side walls are progressively inclined with respect to said first axis towards one transverse end of the air outlet structure.

14. The air outlet structure according to claim 12, wherein said partition walls in at least a portion of said partition walls are progressively inclined with respect to said second axis towards one longitudinal end of the air outlet structure.

15. The air outlet structure according to claim 13, wherein said partition walls in at least a portion of said partition walls are progressively inclined with respect to said second axis towards one longitudinal end of the air outlet structure.

16. The air outlet structure according to claim 12, wherein said side walls in a first portion of said side walls are progressively inclined with respect to said first axis towards a first transverse end of the air outlet structure, and wherein said side walls in a second portion of said side walls are progressively inclined with respect to said first axis towards a second transverse end of the air outlet structure.

17. The air outlet structure according to claim 12, wherein said partition walls in a first portion of said partition walls are progressively inclined with respect to said second axis towards a first longitudinal end of the air outlet structure, and wherein said partition walls in a second portion of said partition walls are progressively inclined with respect to said second axis towards a second longitudinal end of the air outlet structure.

18. The air outlet structure according to claim 16, wherein said partition walls in a first portion of said partition walls are progressively inclined with respect to said second axis towards a first longitudinal end of the air outlet structure, and wherein said partition walls in a second portion of said partition walls are progressively inclined with respect to said second axis towards a second longitudinal end of the air outlet structure.

19. The air outlet structure according to claim 1, wherein each said air outlet is endwardly inclined and sidewardly inclined at different endward inclinations and sideward inclinations, respectively, with respect to an adjacent said air outlet.

20. The air outlet structure according to claim 1, wherein each said partition wall laterally extends between an adjacent pair of said side walls.

21. An air outlet structure for dispersing air flowing out of an opening of a duct of an air conditioning system, comprising:
   a first set of walls, wherein said first set of walls includes more than two side walls, in serially adjacent relationship; and
   a second set of walls, wherein said second set of walls includes more than two partition walls, in serially adjacent relationship;
   wherein said first and second sets of walls are arranged such that said side walls and said partition walls cooperate to form a plurality of air outlets mounted side by side at the opening of the duct to create a grille of air outlets, each said air outlet being the result of the cooperation between two of said side walls and two of said partition walls, and
   wherein more than two of said side walls are inclined at different first inclinations to one another with respect to a first axis and more than two of said partition walls are inclined at different second inclinations to one another with respect to a second axis, said second axis extending along a direction different from said first axis, wherein said first set of walls and said second set of walls are provided as layers overlaid over one another.

22. The air outlet structure according to claim 21, wherein said side walls of said first set of walls are movable about respective first pivot axes to selectively adjust said first inclinations.

23. The air outlet structure according to claim 21, wherein said partition walls of said second set of walls are movable about respective second pivot axes to selectively adjust said second inclinations.

24. An air outlet structure for dispersing air flowing out of an air conditioning system, comprising:
a first set of walls, wherein the first set of walls includes more than two side walls,
a second set of walls, wherein the second set of walls includes more than two partition walls, and
a plurality of air outlets, each said air outlet being defined at least by the cooperation between two of said side walls and two of said partition walls, said plurality of air outlets arranged in a two dimensional array,
the two dimensional array having more than two rows of said air outlets and more than two columns of said air outlets,
each said air outlet being endwardly inclined and sidewardly inclined at different endward inclinations and sideward inclinations, respectively, with respect to an adjacent said air outlet.

25. The air outlet structure according to claim 24, wherein said plurality of air outlets provide a corresponding plurality of air jets, each jet diverging along two different directions with respect to an axis orthogonal to the two dimensional array.

26. The air outlet structure according to claim 24, wherein, in operation, turbulent air jets exit the air outlet structure via the plurality of air outlets.

27. The air outlet structure according to claim 2, wherein a water system spreads small droplets by the aid of said turbulent air jets exiting the air outlet structure via said air outlets.

28. The air outlet structure according to claim 1, wherein each said air outlet is formed by joining two of said side walls to each one of two of said partition walls.

29. The air outlet structure according to claim 24, wherein each said air outlet is formed by joining two of said side walls to each one of two of said partition walls.

30. The air outlet structure according to claim 1, wherein the grille of air outlets is in the form of a two dimensional array having more than two rows of said air outlets and more than two columns of said air outlets, wherein said more than two rows of said air outlets extend along said first axis, and wherein said more than two columns of said air outlets extend along said second axis.

31. The air outlet structure according to claim 1, wherein said grill of air outlets comprises an inlet face and an outlet face, the inlet face being axially spaced from the outlet face, wherein each one of said walls and said partitions are contiguous with said inlet face and said outlet face.

32. The air outlet structure according to claim 1, wherein, in each said air outlet, each respective said side wall is in contact with a respective pair of said partition walls, and each respective said partition wall is in contact with a respective pair of said side walls.

33. The air outlet structure according to claim 1, wherein each said air outlet has an outlet perimeter circumscribed by at least:
a first edge provided by one of the respective two said side walls;
a second edge provided by the other one of the respective two said side walls;
a third edge provided by one of the respective two said partition walls; and
a fourth edge provided by the other one of the respective two said partition walls.

34. The air outlet structure according to claim 24, wherein each said air outlet is endwardly inclined and sidewardly inclined at said different endward and sideward inclinations, respectively, with respect to an adjacent said air outlet in a sideward direction and with respect to another adjacent said air outlet in an endward direction.

35. The air outlet structure according to claim 24, wherein said plurality of air outlets comprises an inlet face and an outlet face, the inlet face being axially spaced from the outlet face, wherein each one of said walls and said partitions are contiguous with said inlet face and said outlet face.

36. The air outlet structure according to claim 24, wherein in each said air outlet, each respective said side wall is in contact with a respective pair of said partition walls, and each respective said partition wall is in contact with a respective pair of said side walls.

37. The air outlet structure according to claim 24, wherein each said air outlet has an outlet perimeter circumscribed by at least:
a first edge provided by one of the respective two said side walls;
a second edge provided by the other one of the respective two said side walls;
a third edge provided by one of the respective two said partition walls; and
a fourth edge provided by the other one of the respective two said partition walls.

* * * * *